(12) United States Patent  
Pelts et al.

(10) Patent No.: US 9,137,502 B2  
(45) Date of Patent: Sep. 15, 2015

(54) METHOD AND SYSTEM FOR FAST DIGITAL CHANNEL CHANGE UTILIZING TIME-STAMP MANAGEMENT

(75) Inventors: Alex Pelts, Morgan Hill, CA (US); Jeffrey Fisher, Dublin, CA (US); David Erickson, San Clemente, CA (US); Jong-Hon Theodore Na, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 683 days.

(21) Appl. No.: 12/874,424

(22) Filed: Sep. 2, 2010

(65) Prior Publication Data

US 2012/0002731 A1 Jan. 5, 2012

Related U.S. Application Data

(60) Provisional application No. 61/360,843, filed on Jul. 1, 2010.

(51) Int. Cl.
| | |
|---|---|
| *H04N 7/12* | (2006.01) |
| *H04N 7/52* | (2011.01) |
| *H04N 21/438* | (2011.01) |
| *H04N 21/43* | (2011.01) |

(52) U.S. Cl.
CPC ............. *H04N 7/52* (2013.01); *H04N 21/4302* (2013.01); *H04N 21/4384* (2013.01)

(58) Field of Classification Search
CPC .................................................... H04N 7/52
USPC .................................................... 375/240.25
See application file for complete search history.

(56) References Cited

U.S. PATENT DOCUMENTS

| | | | | |
|---|---|---|---|---|
| 5,771,075 | A | * | 6/1998 | Rim et al. ..................... 348/512 |
| 6,865,339 | B1 | * | 3/2005 | Gable et al. ................... 386/232 |
| 2005/0013593 | A1 | * | 1/2005 | Jung et al. ....................... 386/98 |
| 2006/0146850 | A1 | * | 7/2006 | Virdi et al. ..................... 370/412 |
| 2006/0262813 | A1 | * | 11/2006 | Dygert .......................... 370/477 |
| 2008/0022320 | A1 | * | 1/2008 | Ver Steeg ....................... 725/78 |
| 2010/0246673 | A1 | * | 9/2010 | Tanaka et al. ............. 375/240.12 |

* cited by examiner

*Primary Examiner* — Richard Torrente

(74) *Attorney, Agent, or Firm* — Foley & Lardner LLP; Christopher J. McKenna; Daniel E. Rose

(57) ABSTRACT

A video stream demultiplexer receives video streams including a selected current content channel and one or more adjacent content channels. Time stamp management may be concurrently performed on the adjacent content channels while decoding the selected current content channel. Timing information such as Decoding Time Stamp, Presentation Time Stamp values, or random access points may be determined for pictures of the selected current content channel and the adjacent content channels. The determined timing information may be utilized to determine a Program Clock Reference value for the selected current channel and the adjacent channels. A timebase, derived from a PCR rate, may be determined for decoding the selected current content channel. An adjacent content channel, which is primed during decoding of the selected current content channel, may be directly decoded for display if selected.

22 Claims, 4 Drawing Sheets

METHOD AND SYSTEM FOR FAST DIGITAL CHANNEL CHANGE UTILIZING TIME-STAMP MANAGEMENT

CROSS-REFERENCE TO RELATED APPLICATIONS/INCORPORATION BY REFERENCE

This patent application makes reference to, claims priority to and claims benefit from U.S. Provisional Patent Application Ser. No. 61/360,843 filed on Jul. 1, 2010.

This application makes reference to:
U.S. application Ser. No. 12/189,022 filed on Aug. 8, 2008,
U.S. application Ser. No. 12/105,127 filed on Apr. 17, 2008, and
U.S. application Ser. No. 10/926,374 filed on Aug. 25, 2004.

Each of the above stated applications is hereby incorporated herein by reference in its entirety.

FIELD OF THE INVENTION

Certain embodiments of the invention relate to communication systems. More specifically, certain embodiments of the invention relate to a method and system for fast digital channel change utilizing time stamp management.

BACKGROUND OF THE INVENTION

Channel change time is an important part of the user experience for digital video or other digital image or content applications. Channel change time represents a delay from the time that a viewer selects a channel for a digital video application to the time that corresponding video information is displayed to the viewer. Channel change time may be a function of many different elements such as tuner acquisition time, encryption descrambling, post-decode processing, and the time required to present the first picture to the viewer after finding a random access point in a video stream. The random access point represents a point in the video stream where a decoder may begin decoding successfully.

Normally, a channel change may comprise locating the random access point and filling a compressed data buffer (CDB) with data starting from this access point, decoding a coded picture, placing the decoded picture in a decoded picture buffer, and presenting the picture to the viewer. The picture is decoded and presented at a time indicated by clock references such as a decoding time stamp (DTS) and a presentation time stamp (PTS) transmitted together with the coded picture.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for fast digital channel change utilizing time stamp management, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for fast digital channel change utilizing time stamp management. In various embodiments of the invention, a video stream demultiplxer may be operable to receive one or more video streams via a video decoding system. The received video streams may comprise a selected current content channel and one or more content channels adjacent to the selected current content channel. Video primers may be utilized by the video stream demultiplxer to concurrently perform time stamp management on each of the one or more adjacent content channels while decoding the selected current content channel. Pictures for the selected current content channel and each of the adjacent content channels may be stored, respectively, in a coded data buffer that is communicatively coupled to the video stream demultiplexer. Timing information such as Decoding Time Stamp (DTS) values, and Presentation Time Stamp (PTS) values, and/or one or more random access points (RAPs) may be determined for the stored pictures of the selected current content channel and the adjacent content channels, respectively. A Program Clock Reference (PCR) value may be determined for each of the selected current content channel and the adjacent content channels based on corresponding determined PTS values for channel monitoring. A PCR rate may be determined for the selected current content channel based on the determined PCR value to derive a timebase. The derived timebase provides a clock reference for decoding pictures of the selected current content channel. The video primers may be operable to prime pictures for the adjacent content channels, during decoding of the selected current content channel, for decoding and displaying. Pictures for one of the adjacent content channels may be directly decoded for display if the one of the adjacent content channels is selected.

Figure 1:
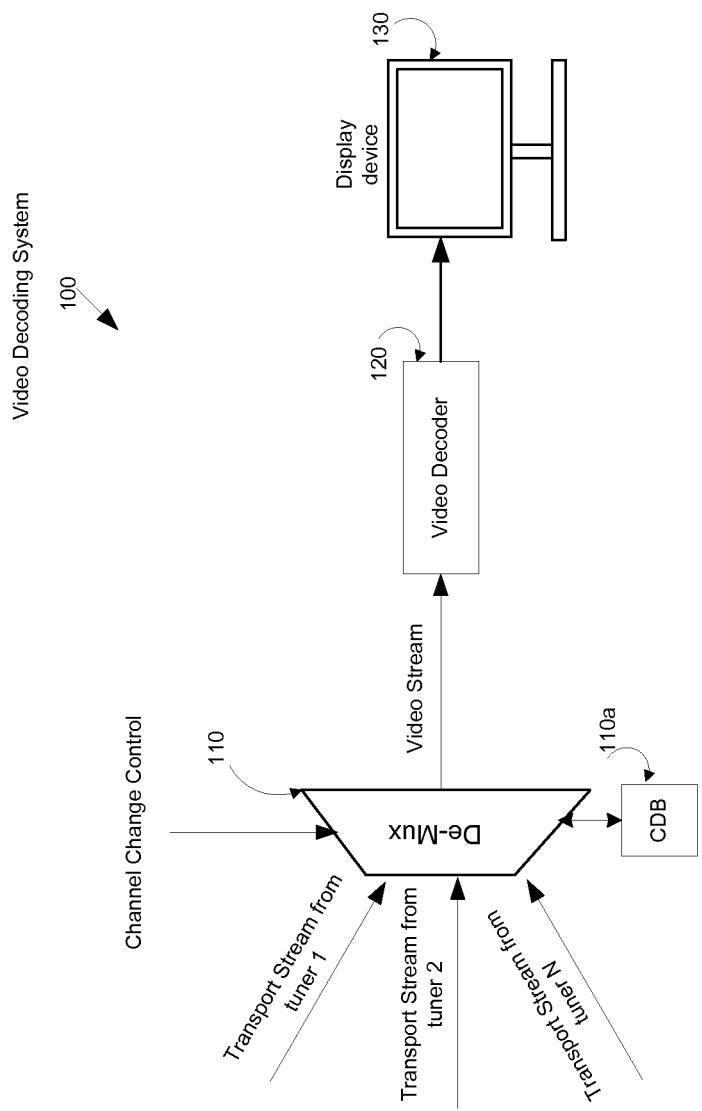
FIG. 1 is a block diagram of an exemplary video decoding system that may be operable to support a fast digital channel change utilizing time stamp management, in accordance with an embodiment of the invention.

FIG. 1 is a block diagram of an exemplary video decoding system that may be operable to support a fast digital channel change utilizing time stamp management, in accordance with an embodiment of the invention. Referring to FIG. 1, there is shown a video decoding system 100. The video decoding system 100 may comprise a demultiplexer (de-mux) 110, a video decoder 120 and a display device 130.

The de-mux 110 may comprise suitable logic, circuitry, interfaces and/or code that are operable to receive one or more video transport streams (TSs) and extract individual content channels, also called channels or programs, from the received TSs. The received TSs may be in various video compression formats such as, for example, MPEG-1, MPEG-2, MPEG-2, and/or H.264/AVC video compression formats. Time stamps such as, for example, reference time stamps, Decoding Time Stamp (DTS) and/or Presentation Time Stamp (PTS) may be embedded in the received TS for control or management of decode, display, and rate conversion for desired channels or programs. The reference time stamps such as Program Clock Reference (PCR) may set a time reference (timing) to assist the video decoder 120 and the display device 130 in presenting desired channels or programs on time, at the right rate, and with synchronization. The DTS and the PTS may indicate the exact time instant where a video frame or picture needs to be decoded and/or presented to the user, respectively. The DTS and the PTS are relative values and may rely on reference time stamps such as the PCR for operation. For example, a current channel may be selected from one or more channels in the received TSs based on device capabilities and/or user preferences. Pictures for the current channel may be decoded and/or presented in instances where the difference of time stamps, for example, PTS-PCR, is achieved to a preset threshold value.

In an exemplary embodiment of the invention, the de-mux 110 may be operable to concurrently store or buffer pictures of the current channel as well as each of the adjacent channels in the received TSs into a compressed data buffer (CDB) 110a. The CDB 110a may comprise suitable logic, circuitry, interfaces and/or code that are operable to store and manage pictures or frames in the received TSs. The CDB 110a is communicatively coupled to the de-mux 110. The CDB 110a may comprise RAM, ROM, low latency nonvolatile memory such as flash memory and/or other suitable electronic data storage capable of storing data and instructions. The de-mux 110 may search for or identify timing information such as PTSs and/or random access points (RAPs) from the stored pictures in the CDB 110a for the current channel and the adjacent channels. A RAP of a specific channel or program may indicate information regarding a location within the specific channel or program for random access of the specific channel or program. The de-mux 110 may be operable to calculate PCR values based on the corresponding identified PTSs for the current channel and each of the adjacent channels, respectively.

In an exemplary embodiment of the invention, the de-mux 110 may be operable to recover a clock for decoding the current channel at a desired rate. In this regard, the de-mux 110 may be operable to determine a PCR rate specifically for the current channel based on a corresponding PCR value. A PCR rate is a sample rate indicating the number of times per second the PCR may appear in the received TSs. The determined PCR rate may be provided as a timebase or a reference clock to the decoder 120 for decoding the current channel at the right rate.

In an exemplary embodiment of the invention, the de-mux 110 may be operable to monitor or track pictures of the adjacent channels utilizing corresponding PCR values. In this regard, the de-mux 110 may be operable to perform time stamp management on pictures of each of the adjacent channels to prime or prepare the adjacent channels for a fast channel change while the current channel is being decoded. Time stamp management comprises functions or features providing accurate control of decode, display, and rate conversion for desired channels. In this regard, pictures of the adjacent channels within the CDB 110a may be managed based on associated time stamp information such as the difference between PTSs and PCRs. For example, pictures of each of the adjacent channels may be discarded if PTS≤PCR. The de-mux 110a may maintain pictures of the specific adjacent channels in the CDB 110a if PTS>PCR. In instances where a specific adjacent channel is selected by the user, the de-mux 110 may be operable to immediately start decoding one or more pictures of the specific adjacent channel if they are ready for decoding.

The video decoder 120 may comprise suitable logic, circuitry, interfaces and/or code that are operable to decompress pictures of individual channels in the received TSs to recover desired channels or programs that may be present at the display device 130.

The display device 130 may comprise suitable logic, circuitry, interfaces and/or code that are operable to present pictures of desired programs or channels to users.

In an exemplary operation, the de-mux 110 may be operable to receive TSs comprising pictures of a current channel as well as pictures of one or more adjacent channels. The de-mux 110 may concurrently store pictures of the current channel and each of the adjacent channels into the CDB 110a. The CDB 110a may be configured to manage pictures of each individual channel in the received TSs. Timing information such as PTSs and/or RAPs may be determined or identified for the current channel and the adjacent channels such that pictures of desired channels may be decoded and presented on time and with synchronization. PCR values may be calculated or determined for the current channel and each of the adjacent channels, respectively, by monitoring the incoming PCR on each adjacent channel. The de-mux 110 may be operable to prime the adjacent channels by performing time stamp management on each of the adjacent channels while decoding the current channel. For example, de-mux 110 may be operable to concurrently decode the current channel and monitor each of the adjacent channels utilizing corresponding PCR values. Pictures of the adjacent channels may be primed such that an adjacent channel, if selected, may have a picture which may be immediately decoded and displayed because the RAP may be present and the buffer level may be already set to the desired level via the video decoder 120 and the display device 130.

Figure 2:
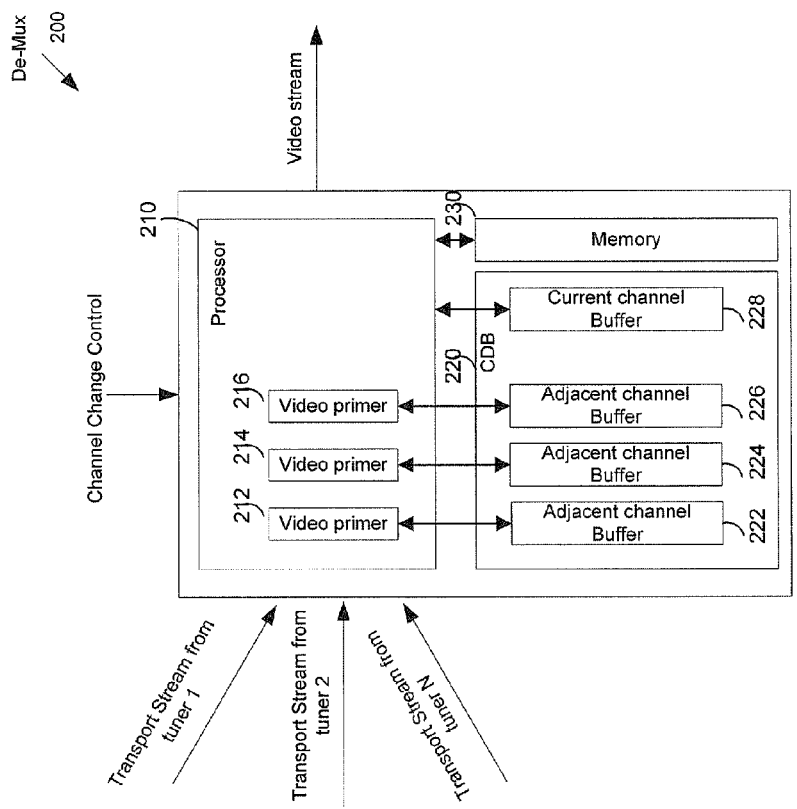
FIG. 2 is a diagram illustrating an exemplary video stream de-multiplexer that is operable to prime adjacent channels utilizing time stamp management for a fast digital channel change, in accordance with an embodiment of the invention.

FIG. 2 is a diagram illustrating an exemplary video stream de-multiplexer that is operable to prime adjacent channels utilizing time stamp management for a fast digital channel change, in accordance with an embodiment of the invention. Referring to FIG. 2, there is shown a de-mux 200 comprising a processor 210, a coded data buffer (CDB) 220, and a memory 230.

The processor 210 may comprise suitable logic, circuitry, interfaces and/or code that are operable to detect and/or handle individual content channels or programs in TSs received via the video decoding system 100. In various exemplary embodiments of the invention, the processor 200 may be operable to concurrently store or buffer pictures in the received TSs into the CDB 220. The stored pictures comprise pictures of the current channel and one or more adjacent channels in the received TSs. Timing information such as PTSs and RAPs may be detected or determined for each channel. A PCR rate may be determined for the current channel based on corresponding calculated PCR value. The determined PCR rate may be utilized as a timebase or a reference clock for decoding pictures of the current channel at the right rate. The processor 210 may monitor or track pictures for the current channel as well as each of the adjacent channels utilizing the PCR values. In this regard, the processor 210 may be operable to perform time stamp management on each of the adjacent channels during decoding of the current channel to prime the adjacent channels for a fast channel change. The processor 210 may assign a different video primer to one of the adjacent channels. For example, video primers 212-216 may be utilized to handle or prime pictures for different adjacent channels, respectively.

A video primer such as the video primer 212 may comprise suitable logic, circuitry, interfaces and/or code that are operable to perform time stamp management on pictures for an adjacent channel. The video primer 212 may prime or prepare the adjacent channel, if selected, for an immediate decode and display. The video primer 212 may be operable to route and/or store pictures of the adjacent channel to the CDB 220 during decoding of the current channel. The video primer 212 may be operable to perform time stamp management by monitoring PTS/PCR differences for stored pictures of the adjacent channels. The video primer 212 may prime the adjacent channels via the time stamp management for a fast channel change over a selected adjacent channel.

The CDB 220 may comprise suitable logic, circuitry, interfaces and/or code that are operable to store and manage pictures or frames of one or more channels in the received TSs. Pictures of different channels may be managed in the CDB 220 individually. For example, pictures of the current channel and each of the adjacent channels may be stored in a current channel buffer 228 and adjacent channel buffers 222-226, respectively. The CDB 220 may comprise RAM, ROM, low latency nonvolatile memory such as flash memory and/or other suitable electronic data storage capable of storing data and instructions.

The memory 230 may comprise suitable logic, circuitry, interfaces and/or code that are operable to store and manage data and/or other information utilized by the processor 210. For example, the memory 210 may be utilized to store executable instructions to prime adjacent channels during decoding of the current channel. The memory 210 may comprise RAM, ROM, low latency nonvolatile memory such as flash memory and/or other suitable electronic data storage capable of storing data and instructions.

In an exemplary operation, the processor 210 may be operable to handle individual channels in TSs received via the video decoding system 100. The processor 200 may be operable to concurrently prime adjacent channels via the video primers 212-216 while decoding a current channel. Each adjacent channel may be handled or managed by a different video primer. A video primer such as the video primer 212 may be operable to perform time stamp management on one adjacent channel during decoding of the current channel. The video primer 212 may be operable to route or store pictures of each of the adjacent channels to the CDB 220, respectively. The video primer 212 may be operable to monitor PTS/PCR differences over the stored pictures of the adjacent channels such that an adjacent channel, if selected, may be ready for immediate decode and display.

Figure 3:
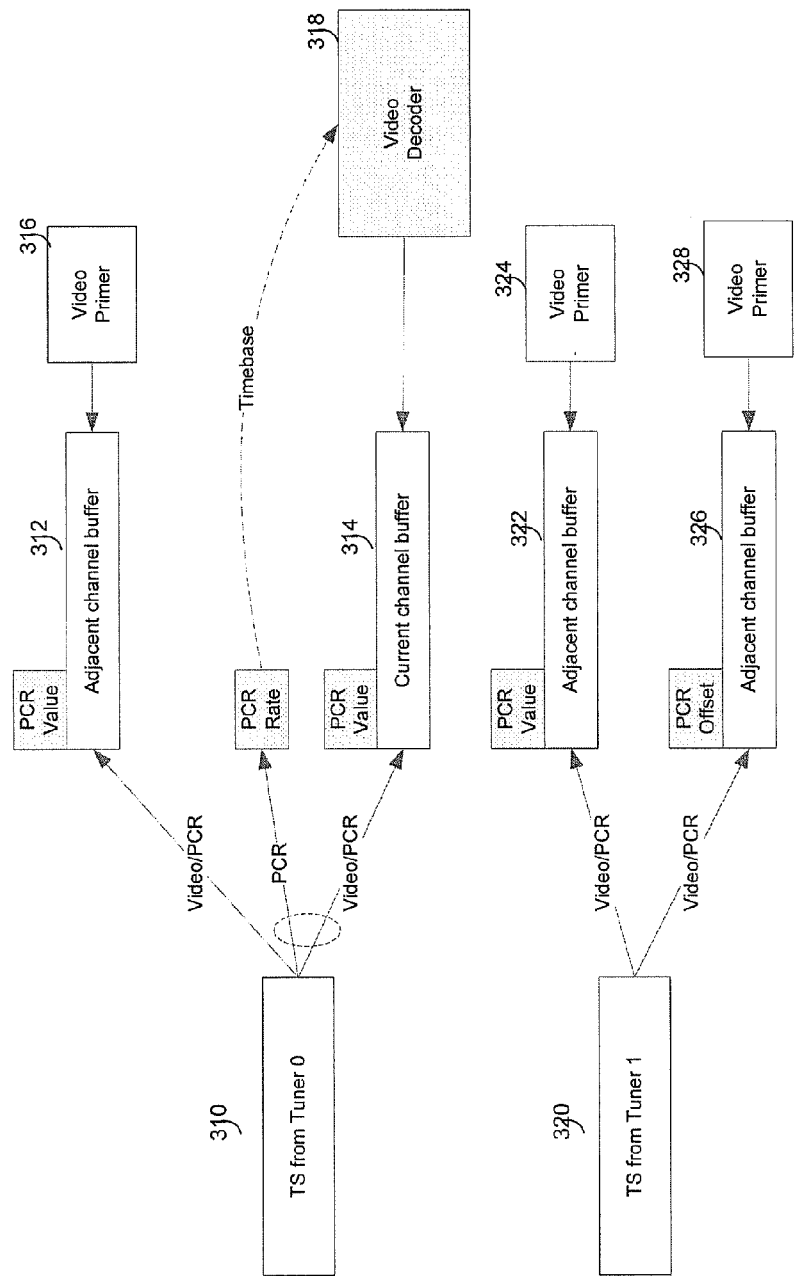
FIG. 3 is an exemplary process for priming adjacent channels utilizing time stamp management for fast digital channel change, in accordance with an embodiment of the invention.

FIG. 3 is an exemplary process for priming adjacent channels utilizing time stamp management for fast digital channel change, in accordance with an embodiment of the invention. Referring to FIG. 3, there is shown an adjacent channel priming processing. It may be assumed in this example that two TSs 310 and 320 may be received by the de-mux 200 and each received TS comprises two channels. Pictures of a current channel, in the TS 310, for example, may be stored in a current channel buffer 314. Pictures for each of the adjacent channels may be stored in adjacent channel buffers 312, 322 and 326, respectively.

PCR values may be determined for the current channel and each of the adjacent channels. Pictures in the current channel buffer 314 and each of the adjacent channel buffers 312, 322 and 326 may be monitored or tracked utilizing corresponding PCR values. With regard to the current channel, a PCR rate may be calculated based on the determined PCR value. The determined PCR rate may be utilized as a timebase or as a reference clock for the video decoder 318 to decode pictures stored in the current channel buffer 314 at right rate.

In various exemplary embodiments of the invention, each adjacent channel may be managed by a particular video primer during decoding of the current channel. For example, video primers 316, 324 and 328 may be utilized to prime pictures in the adjacent channel buffers 312, 322 and 326, respectively, for direct decoding once one of the adjacent channels is selected. Time stamp management may be performed via the video primers 316, 324 and 328 on pictures in the adjacent channel buffers 312, 322 and 326, respectively. Each of the video primers 316, 324 and 324 may be operable to monitor time stamp differences such as PTS-PCR of pictures in each of the adjacent channel buffers 312, 324 and 326. Pictures may be discarded if PTS≤PCR and the next RAP are present. In this way, each of the adjacent channel buffers 312, 324 and 326 may always have a RAP ready to decode. Pictures corresponding to PTS>PCR may be maintained within associated adjacent channel buffers. In this regard, pictures that are ready to be decoded, in the adjacent channel buffer 312, for example, may be provided to the video decoder 318 for immediate decoding and display if an associated adjacent channel is selected.

Figure 4:
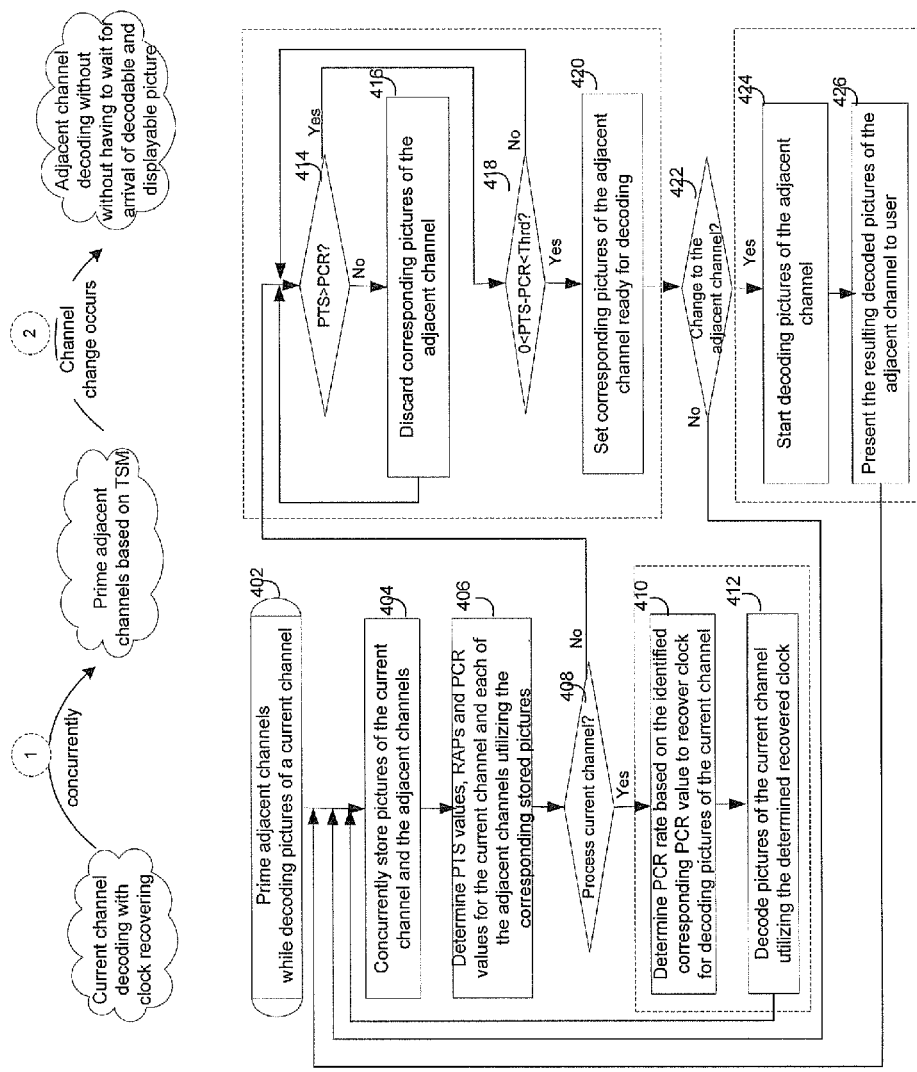
FIG. 4 is a block diagram illustrating exemplary steps that may be performed by a video stream de-multiplexer to prime adjacent channels utilizing time stamp management while decoding a current channel, in accordance with an embodiment of the invention.

FIG. 4 is a block diagram illustrating exemplary steps that may be performed by a video stream de-multiplexer to prime adjacent channels utilizing time stamp management while decoding a current channel, in accordance with an embodiment of the invention. Referring to FIG. 4, the exemplary steps start with step 402. In step 402, the de-mux 200 may be operable to prime adjacent channels while decoding pictures of a current channel. In step 404, the de-mux 210 may be operable to store or buffer pictures in received one or more TSs from the video decoding system 100. In step 406, the processor 210 may be operable to determine or identify timing information such as, for example, PTS values, RAPs and PCR values for the current channel and each of the adjacent channels. In step 408, it may be determined whether the current channel needs to be processed. In instances where the current needs to be processed, then in step 410, a PCR rate may be determined or calculated based on the identified PCR value for the current channel to recover clock for decoding pictures of the current channel. In step 412, the video decoder 318 may be operable to decode pictures from the current channel buffer 314 utilizing the determined PCR rate.

In step 408, in instances where adjacent channels need to be processed, then in step 414. In step 414, a video primer such as the video primer 316 may perform time stamp management on pictures in the adjacent channel buffer 312. It may be determined whether PTS>PCR. In instances where PTS>PCR, then in step 418, the video primer 316 may determine whether PTS-PCR is less than a predetermined threshold value. In instances where PTS-PCR is less than the predetermined threshold value, then in step 420, corresponding pictures in the adjacent channel buffer 312 may be set to be ready for decoding. In step 422, it may be determined whether the adjacent channel is selected. In instances the adjacent channel is selected, then in step 424, the video decoder 120 may be operable to start decoding the pictures in the adjacent channel buffer 312. In step 426, the video decoder 120 may be operable to communicate the resulting decoded pictures with the display device 130 to present to users. The exemplary steps may return to step 404.

In step 414, in instances where PTS≤PCR, then in step 416, corresponding pictures in the adjacent channels 312 may be discarded if the next RAP is present. The exemplary steps may return to step 414.

In step 418, in instances where PTS-PCR is not less than the predetermined threshold value, then the exemplary steps may return to step 414.

In step 422, in instances the adjacent channel is not selected, then the exemplary steps may return to step 404.

In various exemplary aspects of the method and system for fast digital channel change utilizing time stamp management, a video stream demultiplxer such as the de-mux 200 may be operable to receive one or more video streams such as the TS 310 and 320 via the video decoding system 100. The received video streams may comprise a selected current content channel and one or more content channels that are adjacent to the selected content channel. A content channel may also be referred to as a channel or a program. The de-mux 200 may utilize a different video primer to concurrently perform time stamp management on each of the one or more adjacent channels while decoding the selected current channel via the video decoder 318. For example, the video primers 316, 324 and 328 may be utilized or assigned to prime pictures in the adjacent channel buffers 312, 322 and 326 in the CDB 230, respectively. The CDB 230 may comprise the current channel buffer 228 and the adjacent channel buffers 222-226 to store pictures for the selected current channel and each of the adjacent channels, respectively.

Timing information may be determined for the stored pictures of the selected current content channel and the more adjacent content channels, respectively. The determined timing information comprises various time stamp values such as Decoding Time Stamp (DTS) values, and Presentation Time Stamp (PTS) values, and/or one or more random access points (RAPs). The de-mux 200 may be operable to determine a Program Clock Reference (PCR) value for each of the selected current channel and the adjacent channels. A PCR rate may be determined for the selected current channel based on the determined PCR value for the current channel. A timebase may be derived or determined for the selected current channel based on the determined PCR rate. The determined timebase may be provided as a clock reference to the video decoder 318 to decode pictures of the selected current channel. During decoding of the current channel, each of the video primers 316, 324 and 328 may be operable to monitor corresponding adjacent channel utilizing the determined PCR values. Pictures of the adjacent channels may be primed by the video primers for decoding and displaying. Pictures for one of the adjacent channels, if selected, may be directly decoded for display.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for fast digital channel change utilizing time stamp management.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a video decoding system:
  receiving one or more video bitstreams comprising a selected current content channel and one or more adjacent content channels adjacent to said selected current content channel;
  determining a Program Clock Reference (PCR) rate for said one or more adjacent content channels;
  monitoring said one or more adjacent content channels utilizing said PCR rate; and
  concurrently performing time stamp management on and priming of at least one of said one or more adjacent content channels while said selected current content channel is decoded based on said monitoring by:
    storing a coded picture of a first adjacent content channel of said one or more adjacent content channels in a first coded data buffer of the video decoding system,
    determining, by a video primer of the video decoding system, that a Presentation Time Stamp (PTS) of the stored coded picture is either (i) greater than a current PCR value or (ii) not greater than a current PCR value, and
    responsive to the determination, respectively either (i) maintaining the stored coded picture in the first coded data buffer or (ii) discarding the stored coded picture from the first coded data buffer.

2. The method according to claim 1, comprising:
determining a Presentation Time Stamp (PTS) value and a PCR value for said one or more adjacent content channels; and
when a difference between said PTS value and said PCR value is less than a predetermined threshold, setting pictures in at least one of said one or more adjacent content channels to be ready for decoding.

3. The method according to claim 1, comprising:
storing pictures of said selected current channel and said one or more adjacent channels; and
determining timing information for said pictures of said selected current content channel and said one or more adjacent content channels.

4. The method according to claim 3, wherein said timing information comprises at least one of a Decoding Time Stamp (DTS) value, a Presentation Time Stamp (PTS) value, or one or more random access points (RAPs).

5. The method according to claim 4, comprising determining a PCR value for each of said selected current content channel and said one or more adjacent content channels based on said PTS value values.

6. The method according to claim 1, comprising determining a timebase for said selected current content channel based on said PCR rate.

7. The method according to claim 6, comprising decoding said selected current content channel utilizing said timebase.

8. The method of claim 1, further comprising receiving a request to change to the first adjacent content channel; and providing the stored coded picture from the first coded data buffer to a decoder of the video decoding system for immediate decoding and display, responsive to the request.

9. A method for communication, comprising:
in a video decoding system:
receiving one or more video bitstreams comprising a selected current content channel and one or more adjacent content channels adjacent to said selected current content channel;
determining timing information for said selected current content channel and said one or more adjacent content channels, said timing information comprising at least one of Decoding Time Stamp (DTS) values, Presentation Time Stamp (PTS) values, or one or more random access points (RAPs);
determining a Program Clock Reference (PCR) value for each of said selected current content channel and said one or more adjacent content channels based on said PTS values;
determining a PCR rate based on said PCR value for each of said selected current content channel and said one or more adjacent content channels, and determining a timebase for said selected current content channel based on said PCR rate;
decoding said selected current content channel utilizing said timebase;
monitoring said one or more adjacent content channels utilizing said PCR rate;
concurrently performing time stamp management on said one or more adjacent content channels while said selected current content channel is decoded; and
priming said one or more adjacent content channels for decoding and displaying, during said decoding, based on said monitoring by:
storing a coded picture of a first adjacent content channel of said one or more adjacent content channels in a first coded data buffer of the video decoding system,
determining, by a video primer of the video decoding system, that a Presentation Time Stamp (PTS) of the stored coded picture is either (i) greater than a current PCR value or (ii) not greater than a current PCR value, and
responsive to the determination, respectively either (i) maintaining the stored coded picture in the first coded data buffer or (ii) discarding the stored coded picture from the first coded data buffer.

10. The method according to claim 9, comprising, if one of said one or more adjacent content channels is selected, directly decoding said one of said one or more adjacent content channels based on said priming.

11. A system for communication, the system comprising: one or more processors, one or more circuits, or any combination thereof for use a video decoding system operable to:
receive one or more video bitstreams comprising a selected current content channel and one or more adjacent content channels adjacent to said selected current content channel;
determine a Program Clock Reference (PCR) rate for said one or more adjacent content channels;
monitor said one or more adjacent content channels utilizing said PCR rate; and
concurrently perform time stamp management on and prime at least one of said one or more adjacent content channels while said selected current content channel is decoded based on said monitored one or more adjacent content channels monitoring by:
storing a coded picture of a first adjacent content channel of said one or more adjacent content channels in a first coded data buffer of the video decoding system,
determining, by a video primer of the video decoding system, that a Presentation Time Stamp (PTS) of the stored coded picture is either (i) greater than a current PCR value or (ii) not greater than a current PCR value, and
responsive to the determination, respectively either (i) maintaining the stored coded picture in the first coded data buffer or (ii) discarding the stored coded picture from the first coded data buffer.

12. The system according to claim 11, wherein said one or more processors, one or more circuits, or any combination thereof is operable to:
determine a Presentation Time Stamp (PTS) value and a Program Clock Reference (PCR) value for said one or more adjacent content channels; and
when a difference between said PTS value and said PCR value is less than a predetermined threshold, set pictures in at least one of said one or more adjacent content channels to be ready for decoding.

13. The system according to claim 11, wherein said one or more processors, one or more circuits, or any combination thereof is operable to:
store pictures of said selected current channel and said one or more adjacent channels; and
determine timing information for said stored pictures of said selected current content channel and said one or more adjacent content channels.

14. The system according to claim 13, wherein said timing information comprises at least one of a Decoding Time Stamp (DTS) value, a Presentation Time Stamp (PTS) value, or one or more random access points (RAPs).

15. The system according to claim 14, wherein said one or more processors, one or more circuits, or any combination thereof is operable to determine a PCR value for each of said selected current content channel and said one or more adjacent content channels based on said PTS value.

16. The system according to claim 11, wherein said one or more processors, one or more circuits, or any combination thereof is operable to determine a timebase for said selected current content channel based on said PCR rate.

17. The system according to claim 16, wherein said one or more processors, one or more circuits, or any combination thereof is operable to decode said selected current content channel utilizing said timebase.

18. A system for communication, comprising: one or more processors, circuits, or any combination thereof for use a video decoding system operable to:
receive one or more video bitstreams comprising a selected current content channel and one or more adjacent content channels adjacent to said selected current content channel;

determine timing information for said selected current content channel and said one or more adjacent content channels, said timing information comprising at least one of Decoding Time Stamp (DTS) values, Presentation Time Stamp (PTS) values, or one or more random access points (RAPs);

determine a Program Clock Reference (PCR) value for each of said selected current content channel and said one or more adjacent content channels based on said PTS values;

determine a PCR rate based on said determined PCR value for each of said selected current content channel and said one or more adjacent content channels, and determine a timebase for said selected current content channel based on said PCR rate;

decode said selected current content channel utilizing said timebase;

monitor said one or more adjacent content channels utilizing said PCR rate;

concurrently perform time stamp management on said one or more adjacent content channels while said selected current content channel is decoded; and prime said one or more adjacent content channels for decoding and displaying, during said decoding, based on said monitoring by:

storing a coded picture of a first adjacent content channel of said one or more adjacent content channels in a first coded data buffer of the video decoding system, determining, by a video primer of the video decoding system, that a Presentation Time Stamp (PTS) of the stored coded picture is either (i) greater than a current PCR value or (ii) not greater than a current PCR value, and responsive to the determination, respectively either (i) maintaining the stored coded picture in the first coded data buffer or (ii) discarding the stored coded picture from the first coded data buffer.

19. The system according to claim 18, wherein said one or more processors, one or more circuits, or any combination thereof is operable to directly decode one of said one or more adjacent content channels based on said priming if said one of said one or more adjacent content channels is selected.

20. A method for communication, the method comprising:

receiving one or more video bitstreams comprising a selected current content channel and an adjacent content channel;

determining a Program Clock Reference (PCR) rate for said adjacent content channel;

monitoring said adjacent content channel utilizing said PCR rate;

decoding, in a video decoder, said selected current content channel; and concurrently performing time stamp management on and priming of said adjacent content channel while said selected current content channel is decoded based on said monitoring by:

storing a coded picture of a first adjacent content channel of said one or more adjacent content channels in a first coded data buffer of the video decoding system, determining, by a video primer of the video decoding system, that a Presentation Time Stamp (PTS) of the stored coded picture is either (i) greater than a current PCR value or (ii) not greater than a current PCR value, and responsive to the determination, respectively either (i) maintaining the stored coded picture in the first coded data buffer or (ii) discarding the stored coded picture from the first coded data buffer.

21. The method according to claim 20, comprising:

determining a Presentation Time Stamp (PTS) value and PCR value for said adjacent content channel;

determining whether said PTS value is greater than said PCR value; and when said PTS value is not greater than said PCR value, discarding at least one picture in said adjacent content channel.

22. The method according to claim 20, comprising:

determining a Presentation Time Stamp (PTS) value and a PCR value for said adjacent content channel;

determining whether said PTS value is greater than said PCR value; and when said PTS value is greater than said PCR value and a difference between said PTS value and said PCR value is less than a predetermined threshold, setting at least one picture in said adjacent content channel to be ready for decoding.

\* \* \* \* \*